3,053,744
INORGANIC SULPHUR COMPOUNDS
Hugh Leithead Roberts, Northwich, England, assignor to Imperial Chemical Industries Limited, London, England, a corporation of Great Britain
No Drawing. Filed Aug. 4, 1960, Ser. No. 47,384
Claims priority, application Great Britain Aug. 25, 1959
4 Claims. (Cl. 204—157)

This invention relates to inorganic compounds of sulphur, particularly to compounds of sulphur, fluorine and oxygen, some of which are novel, and to a novel method for their preparation.

Some compounds of sulhphur, fluorine and oxygen are known, for example sulphuryl fluoride, thionyl fluoride and disulphur decafluorodioxide $S_2F_{10}O_2$ which is considered to have the peroxide structure $SF_5$—O—O—$SF_5$.

We have now found that by irradiating a mixture of sulphur chloride pentafluoride, $SF_5Cl$, and oxygen with ultraviolet light a mixture of sulphur-fluorine-oxygen compounds is formed consisting mainly of the novel compound disulphur decafluoromonoxide $S_2F_{10}O$ and disulphur decafluorodioxide but also containing small quantities, for example about 5% of the total yield, of the first members of a series believed to have the general formula $SF_5$—(O—$SF_4$)$_n$—$OSF_5$ According to our invention we provide a process for making a mixture of sulphur-fluorine-oxygen compounds comprising as the major products disulphur decafluoromonoxide and disulphur decafluorodioxide, and as minor products compounds having the general formula $$SF_5\text{—(O—}SF_4)_n\text{—}OSF_5$$

in which $n$ may be 1, 2 or a higher number, comprising subjecting a mixture of sulphur chloride pentafluoride and oxygen under substantially anhydrous conditions to the action of ultraviolet light.

The reaction proceeds conveniently at room temperature and atmospheric pressure but it may also be carried out at moderately elevated pressures if desired. It may be run as a batch process, or continuously with recycling of unreacted sulphur chloride pentafluoride/oxygen mixture. The sulphur chloride pentafluoride may be equimolar with the oxygen but is preferably in excess up to about 6 molar; 2 to 3 molar excess is very suitable. There is in the batch process, particularly if the reaction mixture is irradiated for several hours, a greater tendency towards the formation of the compounds $SF_5$—(O—$SF_4$)$_n$—$OSF_5$ than in the continuous process. Increasing the reaction pressure also appears to favour the formation of these higher compounds, but even then they amount to only a minor proportion, for example less than 10%, of the reaction products.

In one way of operating the batch process the reaction products are conveniently removed from the reaction vessel by condensing them in a cold trap after which they are allowed to warm up and liquefy and the liquid mixture washed with aqueous caustic soda or caustic potash to remove unchanged reactants and unwanted chlorine and sulphur-halogen compounds formed in side reactions. After separation the oily non-aqueous layer is readily fractionated in conventional apparatus at atmospheric pressure, the monoxine boiling at 29° C. and the dioxide at 49° C., and any $SF_5$—(O—$SF_4$)$_n$—$OSF_5$ compounds at higher temperatures.

In one way of carrying out the continuous process the contents of the irradiated reaction vessel are slowly extracted by a pump and passed through a scrubbing tower supplied with saturated acidified ferrous sulphate solution, and then through a cold trap at above the boiling point (−21° C.) of sulphur chloride pentafluoride. The reaction products collect in the trap as liquids and unchanged sulphur chloride and oxygen pass on and are returned to the reaction vessel. The latter is fed with make-up consisting of an approximately 3 to 1 by volume mixture of $SF_5Cl$ and oxygen in such amount as to keep the reaction pressure atmospheric. The liquid reaction products may then be refluxed with caustic soda or caustic potash and after separation from the aqueous phase fractionated by known methods.

The dioxide, $S_2F_{10}O_2$, as is known, may be used as an initiator in free-radical-catalysed reaction systems. The novel monoxide, $S_2F_{10}O$, is thermally stable and may be used as a refrigerant and as a dielectric, and also as a starting point for introducing —$SF_5$ groups into certain organic compounds.

The following examples illustrate the invention but do not restrict its scope.

*Example 1*

52 g. of sulphur chloride pentafluoride and 8.5 g. of oxygen were irradiated with ultraviolet light from a 500 watt mercury vapour lamp at room temperature and normal pressure for 24 hours. The reaction products were condensed in a liquid-air trap and then allowed to warm up slowly until liquid. They were then washed with 5% caustic soda solution and after separation the non-aqueous layer consisted of 26 g. of a colourless liquid. Fractionation of this liquid gave 18 g. of $S_2F_{10}O$ boiling at 29° C., analysis of which showed S, 24.9%, F, 69.5%, O, 5.6% (difference). M. wt. 270 reqd. for $S_2F_{10}O$: S, 23.7%; F, 70.5%; O, 5.9%. M. wt. 270. About 6 g. of $S_2F_{10}O_2$ boiling at 49° C. was obtained and about 2 g. of higher boiling colourless liquids whose infra-red spectra indicated their formulae to be $$SF_5\text{—(O—}SF_4)_n\text{—}OSF_5$$

where $n$ is 1 or 2.

*Example 2*

A 10-litre quartz reaction vessel was connected via a pump and scrubbing tower with a cold trap kept at about −15° C. from which a return line communicated with the vessel. The vessel was also attached to a supply-vessel containing a 3 to 1 by volume mixture of $SF_5Cl$ and oxygen. The reaction vessel was irradiated at room temperature with ultra-violet light from four 500 watt mercury vapour lamps and the rate of pumping and supply of fresh reaction mixture co-ordinated so as to keep the pressure through the system substantially atmospheric. Under these conditions about 8 g. per hour of a mixture of the monoxide $S_2F_{10}O$, and dioxide, $S_2F_{10}O_2$ in roughly equal proportions, was collected in the trap for a supply rate of about 2 litres per hour of mixed reactants. The scrubbing tower was fed with an acidified saturated ferrous sulphate solution which was itself recycled from a stock tank of solution containing solid ferrous sulphate to ensure saturation. From time to time the liquids which collected in the trap were drawn off and refluxed with 5% caustic potash from the aqueous phase and fractionated. An approximately 50–60% conversion to the two oxides was achieved, the proportion of higher compounds being less than about 1%.

What we claim is:

1. A process for making a mixture of sulphur-fluorine-oxygen compounds comprising as the major products disulphur decafluoromonoxide and disulphur decafluorodioxide, and as minor products compounds having the general formula $SF_5-(O-SF_4)_n-OSF_5$, in which $n$ may be an integer of at least 1, comprising subjecting a mixture of sulphur chloride pentafluoride and oxygen under substantially anhydrous conditions to the action of ultra-violet light.

2. A process as claimed in claim 1 in which from 1 to 6 moles of sulphur chloride pentafluoride are employed for each mole of oxygen.

3. A process as claimed in claim 1 in which the reaction products after they have been treated with acidified ferrous sulphate solution and an aqueous alkaline solution are fractionally distilled to separate each of disulphur decafluoromonoxide and disulphur decafluorodioxide.

4. Process for making mixtures of compounds having the general formula $SF_5-(O-SF_4)_n-OSF_5$ where $n$ is an integer of at least 1, comprising fractionally distilling mixtures of sulphur-fluorine-oxygen compounds obtained by the processes of claim 1.

References Cited in the file of this patent

UNITED STATES PATENTS

| | | |
|---|---|---|
| 2,925,368 | Sandbery et al. | Feb. 16, 1960 |
| 2,946,661 | Dudley et al. | July 26, 1960 |

FOREIGN PATENTS

| | | |
|---|---|---|
| 388,725 | Great Britain | 1933 |